March 28, 1944.  E. PANTHOEFER  2,345,145
FEED GEAR
Filed March 7, 1940  2 Sheets-Sheet 1

Inventor:
EMIL PANTHOEFER
By *[signatures]*
Attorneys

March 28, 1944. E. PANTHOEFER 2,345,145
FEED GEAR
Filed March 7, 1940 2 Sheets-Sheet 2
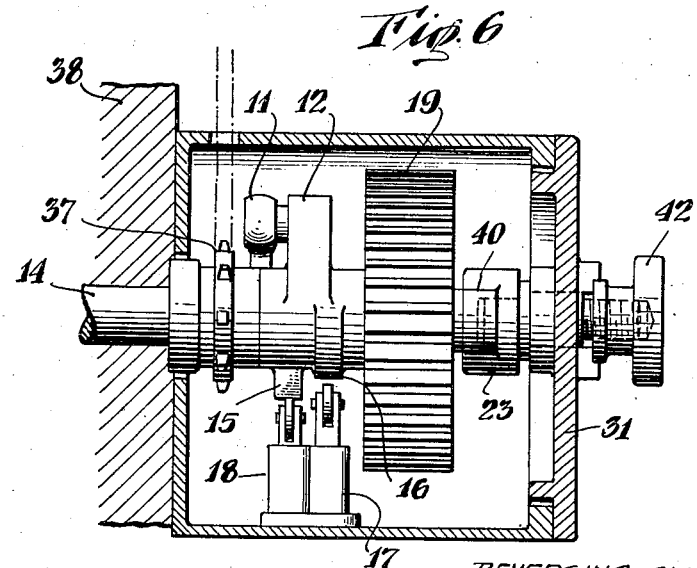
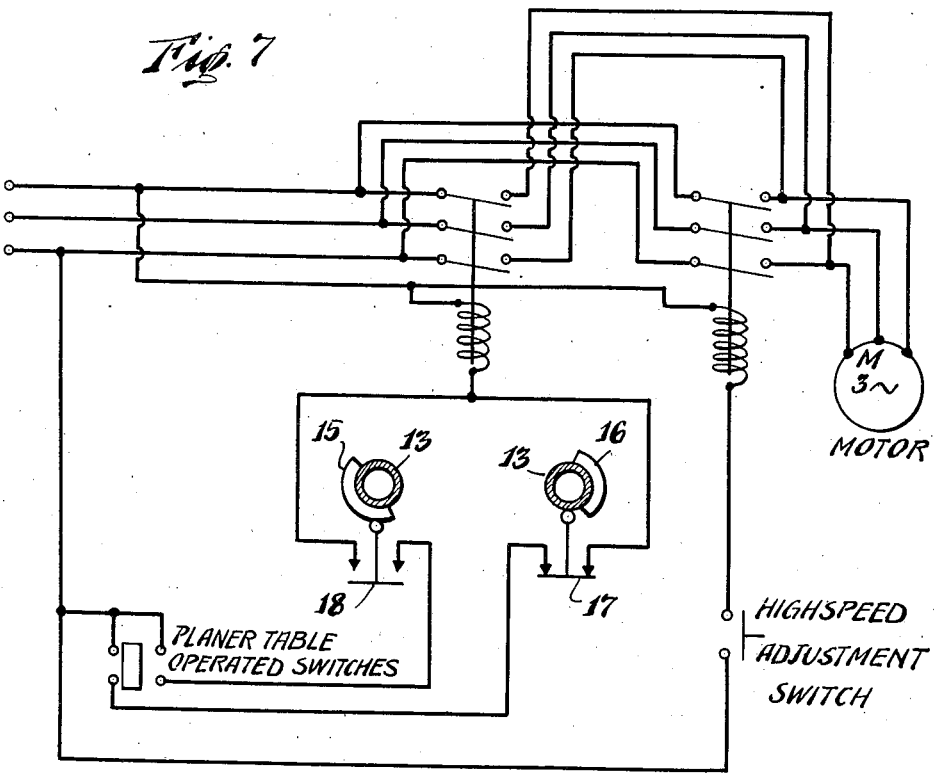
INVENTOR
Emil Panthoefer
BY
ATTORNEYS Patented Mar. 28, 1944

2,345,145

UNITED STATES PATENT OFFICE 2,345,145

FEED GEAR

Emil Panthoefer, Siegen, Germany; vested in the Alien Property Custodian

Application March 7, 1940, Serial No. 322,679
In Germany January 26, 1939

11 Claims. (Cl. 90—49)

My invention relates to improvements in feed gears and has for an object to provide improved means for effecting feed motion and the high speed adjustment of the tool supporting slide of planers or the like. The object of this invention is to provide a feed gear which is simple and cheap and which can easily be attached to the planing machine. The invention contemplates the arrangement of means for transmitting one direction of rotation of the motor for effecting the feed motion of the slides and in the arrangement of means for utilizing the other direction of rotation of the motor for the high speed adjustment of the slides.

Other objects of the improvements will appear from the following description.

The accompanying drawings show one example of how the invention may be applied, and this example will clearly explain the idea of the invention.

In said drawings,

Fig. 6 is a cross-sectional view taken on the line 6—6 of Fig. 3; and

Fig. 7 is a more or less diagrammatic view showing the diagram of a suitable wiring arrangement.

Figure 1:
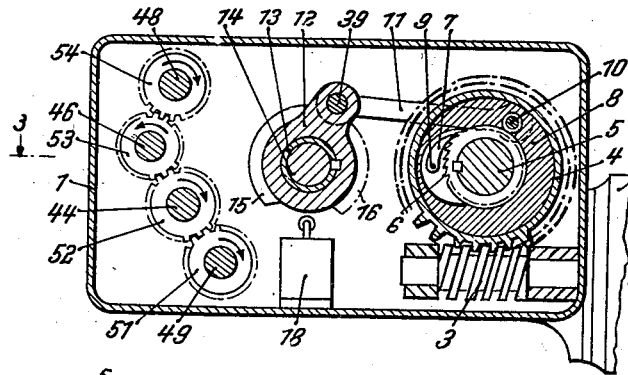
Fig. 1 is a vertical section through the gear box on the line 1—1 of Fig. 3.

The electric motor 2 is attached to the gear box 1 which is fastened to the cross rail 38 of the planer and said electric motor by means of worm 3 drives the worm wheel 4 which is firmly connected with the feed shaft 5. Inside the worm wheel 4 there are on a hub the feed teeth 6 into which a feed pawl 7 can catch. A crank pin 10 is screwed into the pawl-carrier 8 on which the pawl bolt 9 is supported; said crank pin 10 will swing to and from the crank arm 12 by means of the connecting rod 11 and by means of the pin 39.

This crank arm 12 is firmly attached to the bushing 13 which turns around the fixed pin 14, and which by means of the connecting rod is made to swing to and fro. Two cams 15, 16 are connected with the crank 12, and these cams act upon two end switches 17, 18 for the electric motor 2, said switches being arranged within the lower part of the gear box 1.

The following transmission of the gear motion from the bushing 13 is effected in the well known manner.

Figure 3:
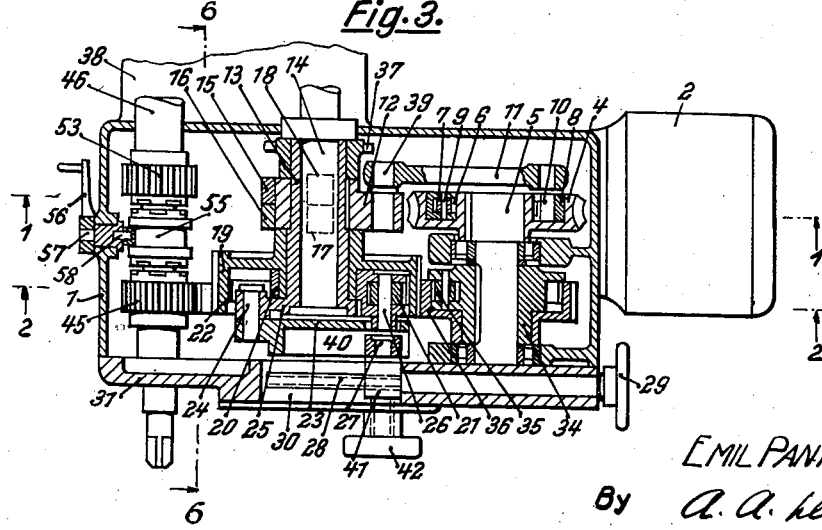
Fig. 3 is a horizontal section on line 3—3 of Fig. 1.

The bushing 13, see Fig. 3, carries the loose or movable feed wheel 19 and a loose pawl ring 20 runs on its inside hub. The feed pawl 21 on this pawl ring 20 catches into the inside teeth 22 of the feed wheel 19. The oscillating movement of the bushing 13 is transmitted by means of a lever 23 to the pawl ring 20; one end of the lever 23 is connected by means of a joint pin 24 with the oscillating arm 25 of the bushing 13, whereas the pawl pin 26 of the pawl ring 20 catches into the other end of said lever 23. An immovable pin 27 catches into a groove 40 of the lever 23 which can swing around said pin 27. The position of the pin 27 can be altered in the slot 30 of the box cover 31 by the screw 28 and nut 41 by means of the hand wheel 29. The pin 27 is fastened by means of the nut 42. The nearer the pin 27 approaches the pawl pin 26, the smaller will be the movement of this latter and hence the movement of the pawl 21.

Figure 2:
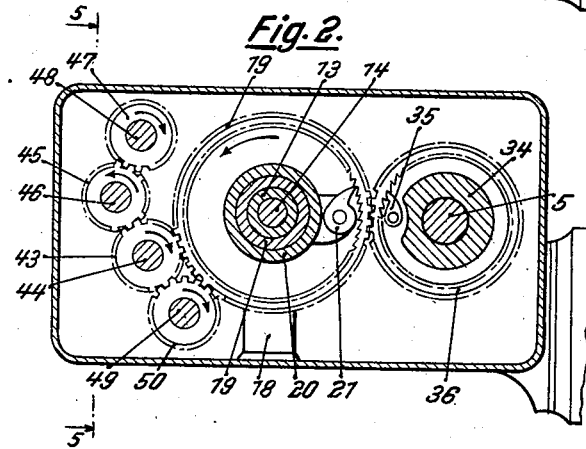
Fig. 2 is a section on line 2—2 of Fig. 3.

It will be noted that the bushing 13 and the arm 25 and joint pin 24 carried thereby are caused at certain times to oscillate through about a one-fourth turn due to the action of connecting rod 11 (see Fig. 1). This oscillation will cause the left end of lever 23, as seen in Fig. 3, to move vertically. Its other end is connected by pin and slot connection to the pin 26 (Fig. 3) which carries the pawl 21 (Figs. 2 and 3). The pin or stud 27 (Fig. 3) normally occupies a position somewhat to the left of the position shown in Fig. 3. This pin 27 engages in the groove 40 of the lever 23 and serves as a fulcrum about which the lever 23 oscillates. Since the lever 23 operates as a lever of the first class its right hand end oscillates up and down, depending upon the position of the fulcrum 23. The up and down movement of the right hand end of lever 23 causes the pawl 21 to be moved up and down so that its engagement with internal ratchet teeth 22 will cause the wheel 19 to advance counter-clockwise. The position of pin 27 determines the amount of movement given to the right hand end of lever 23, this movement becoming less as the abutment pin 27 is moved toward the right until the pin 27 is aligned with the pin 26, in which situation no movement whatever is imparted to the pin 26 and the pawl 21. By a small adjustment of the pin 27, made whilst the machine is running, the movement of the pawl pin 26 and of the pawl 21 can therefore be modified in this well known manner, and this means that the length of the feed of the tool carriers is changeable.

The rotation of the feed wheel 19 is, in the well known manner, transmitted to the feed screws of the tool carriers which slide on the cross rail of the planer.

Figure 5:
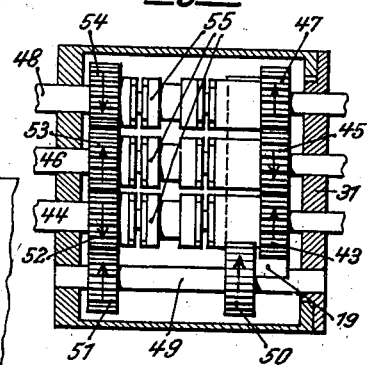
Fig. 5 is a section on line 5—5 of Fig. 2.

As will be seen from Fig. 5 the wheel 43 on the feed screw 44 meshes with the feed wheel 19 and (see Figure 2) shaft or spindle 46 is driven by wheel 45 and shaft or feed screw 48 is driven by wheel 47.

As is usual in machines of this type, the feed screws 44, 46, and 48 serve to adjust the transverse position of the tool carriers on the cross-slide and also the vertical position of the cross-slide upon the standards of the planer. For example, feed screw 44 is threaded, as usually, over substantially its entire length and engages with a non-rotatable nut in one of the tool carriers. Therefore, rotation of the feed screw 44 will cause the tool carrier to be shifted transversely on the cross-slide. Feed screw 48 may be similarly connected for adjusting the other tool carrier transversely. Similarly, shaft or spindle 46 may be connected in any suitable manner for adjusting the cross-slide vertically along the usual guideways formed on the standards. This may be accomplished, for example, by pinions on shaft 46 engaging racks attached to the standards, or if a more powerful action is required, suitable gear reduction means may be interposed between the shaft 46 and the pinions which engage the racks in the standard. Various other connecting means may of course also be used, such as vertical feed screws which pass through non-rotatable nuts in the cross slide. These vertical feed screws are driven by shaft 46 through bevel gears, the bevel gears on the vertical feed screws being feather-keyed thereon.

In the lower part of the gear box 1 there is a shaft 49 to which the wheels 50 and 51 are fastened. The wheel 50 likewise meshes with the feed wheel 19 the teeth of which are twice as broad as those of the wheels 43 and 50 which however do not mesh with each other.

From the wheel 51 the shafts 44 and 48 can be driven by means of the wheels 52, 53 and 54 (see Fig. 1.)

On each shaft there is a clutch 55 which a lever 56 can shift by means of a bolt 58 eccentrically arranged in connection with the lever-shaft 57. The direction of rotation of the wheels 52, 45 and 54 is the reverse of that of the wheels 43, 53, 47; by moving the clutches the feed screws 44, 46 and 48 will therefore, as the case may be, rotate to the right, rotate to the left or stand still.

Another pawl carrier 34 is firmly connected with the feed shaft 5 for the purpose of a quick adjustment; said pawl carrier 34 drives the intermediate wheel 36 by means of a high speed pawl 35 (see Fig. 2). This intermediate wheel meshes directly with the feed wheel 19.

Figure 4:
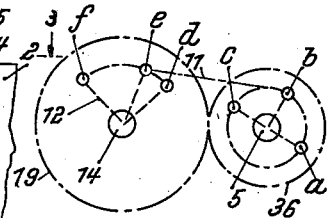
Fig. 4 shows—schematically—certain positions of the crank gear.

The feed motion is as follows:

When the motor 2 runs in a forward direction, the shaft 5 will turn counter-clockwise and will thereby carry along, by means of feed pawl 7, pawl-carrier 8 and crank pin 10 the connecting rod 11 which will then cause the bushing 13 to oscillate as much as is necessary for the feed motion. As is known and customary, the feed motion is effected at the end of each return stroke of the planer and the return motion of the connecting rod 11 and of the other feed gear occurs at the end of each cutting stroke. This return stroke of the feed gear in connection with a chain wheel or sprocket 37 can be made use of in the well known manner for lifting the tool (see Fig. 6). Referring to Fig. 4 we suppose that $a$ is the position of the crank pin 10 before the table starts its return stroke. Then, again in the well known manner, the feed motion is started by means of an operating switch on the bed of the planer, after the return stroke is finished; then the crank pin 10 is moved by means of motor 2 from $a$ over $b$ to $c$ which means that the feed motion is carried out, the crank arm 12 swinging from point $d$ over $e$ to $f$. At this point the motor is switched off by means of the end switch 18 acted upon by the cam 15. At the end of the cutting stroke the motor is switched on again by the operating switch and will run in the same direction until crank pin 10 has gone from $c$ back to $a$. Here the motor is switched off again by the end switch 17 acted upon by the cam 16.

The motor always running in the same direction therefore turns the feed shaft 5 with each motion and with each tool lift, by 180 degrees. During this feed motion the intermediate wheel 36 of the high speed adjustment can move independently of the feed shaft, since the high speed pawl 35 is ineffective.

The high speed adjustment is started by means of a switch which causes the motor to run in a direction opposite to that which it had during the feed motion and causing the feed shaft 5 to run clockwise. Thereupon the pawl carrier 34 by means of the high speed pawl 35 will move the intermediate wheel 36 and thereby the feed wheel 19 which will turn in the same direction as during the feed motion.

With this direction of rotation of the feed shaft, the feed pawl 7 is ineffective so that during the quick adjusting motion the feed mechanism is made ineffective.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In a planing machine, the combination of a plurality of tool carriers; a feed shaft for each carrier; a feed gear; gearing connecting said feed gear with said feed shafts; a driven shaft adapted to be alternatively driven in opposite directions at the same rate of speed; means actuated by said driven shaft, when it is driven in one direction, to drive the feed gear at a low rate of speed; and means actuated by said driven shaft, when it is driven in the opposite direction, to drive the feed gear at a higher rate of speed, the direction of rotation of the feed gear being the same in both cases.

2. In a planing machine, the combination of a plurality of tool carriers; a feed shaft for each carrier; a feed gear; gearing connecting said feed gear with said feed shafts; a driven shaft adapted to be alternatively driven in opposite directions; means adapted to cause intermittent rotation of said feed gear during alternate half-revolutions of said driven shaft when it is driven in one direction; and means adapted to cause continuous rotation of said feed gear when the driven shaft is driven in the opposite direction, the direction of rotation of the feed gear being the same in both intermittent and continuous rotation.

3. In a planing machine, the combination of a plurality of tool carriers; a feed shaft for each carrier; a feed gear; gearing connecting said feed gear with said feed shafts; a driven shaft adapted to be alternatively driven in opposite directions; adjustable means actuated by said driven shaft, when it is driven in one direction, adapted to rotate said feed gear sufficiently to cause a predetermined extent of movement of said tool carriers; and means actuated by said driven shaft, when it is driven in the opposite direction, to rotate said feed gear, the direction of rotation of the feed gear being the same in both cases.

4. In a planing machine, the combination of a plurality of tool carriers; a feed shaft for each carrier; a feed gear; means driven by said feed gear to cause the feed shafts to feed the tool carriers toward the work; means driven by the feed gear to cause the feed shafts to retract the tool carriers; means adapted to alternatively connect the feed gear with said feeding and retracting means; a driven shaft adapted to be alternatively driven in opposite directions at the same rate of speed; means actuated by said driven shaft, when it is driven in one direction, to drive the feed gear at a low rate of speed when it is connected with the means for feeding the tool carriers; and means actuated by the driven shaft, when it is driven in the opposite direction, to drive the feed gear at a higher rate of speed when it is connected with the means for retracting the tool carriers, the direction of rotation of the feed gear being the same in both cases.

5. In a planing machine, the combination of a plurality of tool carriers; a feed shaft for each carrier; a feed gear; two sets of gears for alternatively connecting said feed gear with said feed shafts, one of said sets being adapted to feed the said tool carriers toward the work, and the other of said sets being adapted to retract the said tool carriers; a clutch associated with each shaft whereby the shaft can be connected to and disconnected from either of said sets of gears; a driven shaft adapted to be alternatively driven in opposite directions at the same rate of speed; means actuated by said driven shaft, when it is driven in one direction, to drive the feed gear at a low rate of speed when it is connected with the feed shafts by the set of gears which feeds the tool carriers; and means actuated by said driven shaft, when it is driven in the opposite direction, to drive the feed gear at a higher rate of speed when it is connected with the feed shafts by the set of gears which retract the tool carriers, the direction of rotation of the feed gear being the same in both cases.

6. In a planing machine, the combination of a plurality of tool carriers; a feed shaft for each carrier; a feed gear; gearing connecting said feed gear with said feed shafts; a driven shaft adapted to be alternatively driven in opposite directions, and having ratchet teeth thereon; a collar loose on said driven shaft and carrying a pawl which co-acts with said ratchet teeth; a connecting rod having one end pivoted on said collar; a crank-arm on which the other end of the connecting rod is pivoted; means actuated by the reciprocation of said crank-arm adapted to rotate said feed gear; a pawl rotatable with said driven shaft; and a gear wheel loose on said driven shaft, having ratchet teeth co-acting with the pawl on the driven shaft, and meshing with the feed gear, the ratchet teeth on the driven shaft and their co-acting pawl, and the pawl on the driven shaft and its co-acting ratchet teeth being so related that the former set of teeth and pawl effect rotation of the feed gear when the driven shaft rotates in one direction, and the latter set of teeth and pawl effect rotation of the feed gear when the driven shaft rotates in the opposite direction, the direction of rotation of the feed gear being the same in both cases.

7. In a planing machine, the combination of a plurality of tool carriers; a feed shaft for each carrier; a feed gear provided with ratchet teeth; gearing connecting said feed gear with said feed shafts; a rockable pawl adapted to co-act with said ratchet teeth, to rotate said feed gear when the pawl is moved in one direction, and to idle on said teeth when it is moved in the opposite direction; means for rocking said pawl; a driven shaft for so actuating said rocking means that the successive half-revolutions of said shaft rock the pawl in opposite directions, respectively; an electric motor for driving said driven shaft; means for starting said motor; and means for stopping said motor, actuated by said pawl-rocking means, and adapted to stop the motor at the end of each half-revolution of the driven shaft.

8. In a planing machine having a reciprocating work table, the combination of a plurality of tool carriers; a feed shaft for each carrier, a feed gear provided with ratchet teeth; gearing connecting said feed gear with said feed shafts; a rockable pawl adapted to co-act with said ratchet teeth, to rotate said feed gear when the pawl is moved in one direction, and to idle on said teeth when it is moved in the opposite direction; and means adapted to cause said pawl to alternately idle on said teeth and to rotate the feed gear sufficiently to cause a predetermined feed of said tool carriers, said pawl operating means being caused to operate automatically by the travel of said work table, the pawl idling at the end of the working stroke of the table, and the pawl rotating the feed gear at the end of the return stroke of the table.

9. In a planing machine having a reciprocating work table, the combination of a plurality of tool carriers; a feed shaft for each carrier; a feed gear provided with ratchet teeth; gearing connecting said feed gear with said feed shafts; a rockable pawl adapted to co-act with said ratchet teeth, to rotate said feed gear when it is moved in one direction, and to idle on said teeth when it is moved in the opposite direction; means adapted to rock said pawl; a driven shaft adapted to actuate said rocking means; an electric motor adapted to drive said driven shaft; and four switches for controlling the operation of said motor, two of said switches being automatically operated by the reciprocation of said work table, and the other two switches being automatically operated by the said rocking means, the parts being so related and the switch circuits being such that at the end of the working stroke of the table the circuit is closed to cause the motor to drive the shaft to cause the rockable pawl to idle on the ratchet teeth of the feed gear, and the circuit is opened to stop the motor when the shaft has made a half revolution, and at the end of the return stroke of the working table the circuit is closed to cause the motor to drive the shaft to cause the rockable pawl to rotate the feed gear sufficiently to cause a predetermined feed of the tool carriers, and the circuit is opened to stop the motor when the shaft has made a half revolution.

10. In a planing machine having a reciprocating work table, the combination of a plurality of tool carriers; a feed shaft for each carrier; a feed gear provided with ratchet teeth; gearing connecting said feed gear with said feed shafts; a driven shaft having ratchet teeth thereon; a collar loose on said driven shaft and carrying a pawl which co-acts with the shaft ratchet teeth; a connecting rod having one end pivoted on said collar; a crank arm on which the other end of the connecting rod is pivoted; a rockable sleeve on which said crank arm is mounted; a lever having one end pivoted on said sleeve, and being fulcrumed on a fixed portion of the machine; a second rockable sleeve on which the other end of said lever is pivoted; a pawl on said second sleeve, adapted to co-act with the ratchet teeth on the feed gear, to rotate said feed gear when the pawl is moved in one direction, and to idle on said teeth when it is moved in the opposite direction; an electric motor adapted to drive said driven shaft; and four switches for controlling the operation of said motor, two of said switches being automatically operated by the reciprocation of the work table, and the other two switches being automatically operated by the rocking of the first mentioned rockable sleeve, the parts being so related and the switch circuits being such that at the end of the working stroke of the table the circuit is closed to cause the motor to drive the shaft to cause the rockable pawl to idle on the ratchet teeth of the feed gear, and the circuit is opened to stop the motor when the shaft has made a half revolution, and at the end of the return stroke of the working table the circuit is closed to cause the motor to drive the shaft to cause the rockable pawl to rotate the feed gear sufficiently to cause a predetermined feed of the tool carriers, and the circuit is opened to stop the motor when the shaft has made a half revolution.

11. In a planing machine having a reciprocating work table, the combination of a plurality of tool carriers; a feed shaft for each carrier; a feed gear; gearing connecting said feed gear with said feed shafts; a driven shaft; means which are alternately positioned to function and actuated by the driven shaft when it is rotated in one direction, to cause intermittent rotation of the feed gear; means actuated by the driven shaft when it is rotated in the opposite direction to cause continuous rotation of the feed gear; an electric motor adapted to drive said shaft; four switches for controlling the operation of said motor, two of said switches being autmatically operated by the reciprocation of the work table, and the other two switches being automatically operated by the said means for causing intermittent rotation of the feed gear; and a fifth switch manually operated and adapted to control a circuit to the motor by which the motor is caused to change its direction of rotation, the parts being so related and the switch circuits being such that at the end of the working stroke of the table the circuit is closed to cause the motor to drive the shaft and the circuit is opened to stop the motor when the shaft has made a half revolution, the direction of rotation of the shaft being such that the means to cause intermittent rotation of the feed gear is positioned to function, and at the end of the return stroke of the table the circuit is closed to cause the motor to drive the shaft, in the same direction, to cause the means to cause intermittent rotation of the feed gear to rotate the feed gear, and the circuit is opened to stop the motor when the shaft has made a half revolution, and when the manually operated switch is closed the motor rotates in the direction opposite to its previous direction causing the shaft to actuate the means for causing continuous rotation of the feed gear, which rotation continues so long as the manually operated switch closes its circuit.

EMIL PANTHOEFER.